United States Patent [19]
Hermsen

[11] 3,858,493
[45] Jan. 7, 1975

[54] FILTER DEVICE FOR PRODUCING FILTERED COFFEE BEVERAGES

[76] Inventor: Manfred Hermsen, Langenstrasse 12, 28 Bremen, Germany

[22] Filed: Feb. 20, 1973

[21] Appl. No.: 333,931

[30] Foreign Application Priority Data
Feb. 19, 1972 Germany............................ 2207839

[52] U.S. Cl..................... 99/306, 210/405, 210/456
[51] Int. Cl. ......................... A47j 31/00, B01d 23/20
[58] Field of Search ............. 99/287, 304, 306, 320; 210/405, 418, 446, 448, 451, 455, 456

[56] References Cited
UNITED STATES PATENTS
1,901,611   3/1933   Porter.................................. 99/306
1,953,291   4/1934   DeVry ............................. 99/306 X
2,285,930   6/1942   Kahan................................... 99/306

FOREIGN PATENTS OR APPLICATIONS
115,370   12/1929   Austria .............................. 210/456

*Primary Examiner*—Samih N. Zaharna
*Assistant Examiner*—Richard W. Burks
*Attorney, Agent, or Firm*—Sughrue, Rothwell, Mion, Zinn & MacPeak

[57] ABSTRACT

In the preparation of coffee by pouring hot water over coffee grounds disposed over a filter in a cylindrical container, a float member is first placed on top of the grounds to deflect the water as it is poured in, thereby preventing the impact from the pour stream from driving the grounds into the filter mesh openings.

7 Claims, 1 Drawing Figure

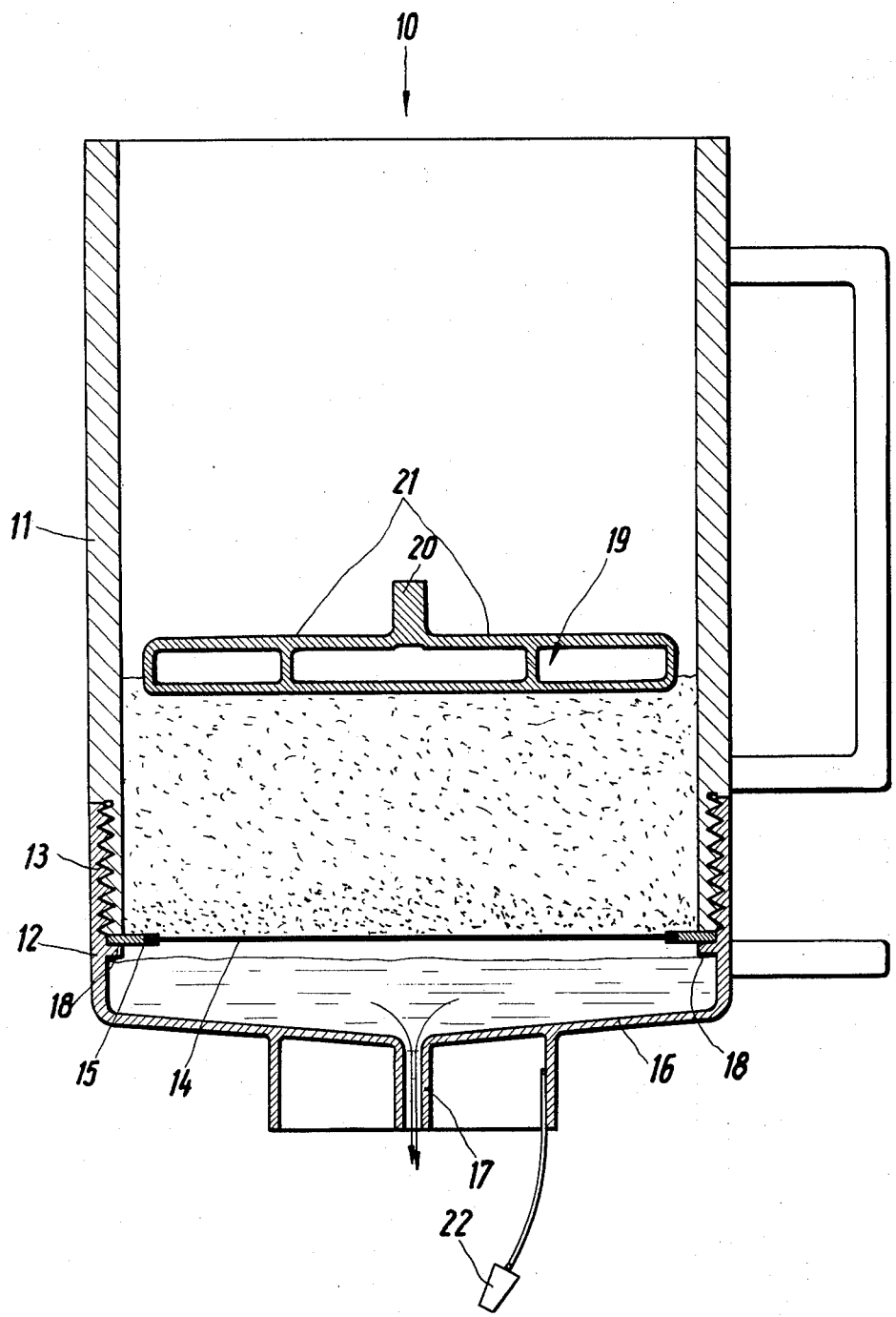

FILTER DEVICE FOR PRODUCING FILTERED COFFEE BEVERAGES

BACKGROUND OF THE INVENTION

1. Field of the Invention

The present invention relates to a filter device for producing filtered coffee beverages. The device comprises a filtering surface for receiving the ground roast coffee, over which water is to be poured. An outlet for the beverage is provided below the filtering surface.

2. Prior Art

The invention relates to the production of filtered coffee. Hitherto, this has been prepared for the most part with filter devices using filter paper, which can only be used once. The disadvantage of these known filter devices is the extent to which the aroma and taste of the coffee are affected by the filter paper.

SUMMARY OF THE INVENTION

The object of the invention is to provide a filter device which comprises a filtering surface suitable for repeated use and with which a perfect beverage may be prepared, i.e., a largely clear beverage free of any solid matter and having an improved aroma.

The filter device according to the invention is characterized in that an element for deflecting the water to be poured on is arranged above the filtering surface (sieve netting). This deflecting element rises with the water level in the device and consists preferably of a loose floating body disposed in the container.

The invention is based on the idea that the preparation of a perfect coffee beverage is adversely affected when the water is poured over the coffee in the form of a jet. The force of the jet of water presses the coffee, which is in part finely grained, against, or into the fine mesh filtering surface. In this way, solid particles are pressed into the holes in the filtering surface. These particles remain in the holes and thus clog the filtering surface. As a result, the beverage is prevented from flowing freely through the filtering surface.

Accordingly, the essence of the invention consists in destroying this effective force above the filtering surface. In this way, the water reaches the filtering surface without any appreciable force. As a result, no solid matter particles are forced through the filtering surface or pressed into the same. Consequently, extremely close-meshed sieve netting, having a mesh width of less than $10\mu$, more particularly $5\mu$, may be used.

The device according to the invention is also suitable for the preparation of tea beverages, more particularly when the outlet is provided with the cutoff arrangement according to the invention.

The drawing provides a vertical, sectional view of an embodiment of the invention.

Description of the Preferred Embodiment

The filter device consists of a container 10 having an upper part 11 and a lower part 12. The container 10 is open at the top and bottom and has a constant internal cross-section over at least a portion of its height. The upper part 11 and the lower part 12 are releasably connected to each other, for example by a screw thread 13.

A filtering surface, preferably consisting of a polyester sieve netting 14, is arranged within the container 10. The sieve netting 14 is held in a circumferential, framelike holder 15, which in itself defines the free filtering surface of the sieve netting 14. The sieve netting 14 is interchangeably mounted with the holder 15 in the lower part 12 of the container 10. The holder 15 is held on a flange 18 of the lower part 12 by the lower edge of the upper part 11, which is screwed onto the lower part 12. The container 10, more particularly its lower part 12, is provided with a base 16 having a discharge connection 17.

To use the filter device, the coffee grounds are placed on the sieve netting 14. A deflecting element in the form of an impervious floating body 19 is placed on the coffee. The floating body 19 is preferably a hollow plastic body having a handle 20 on its upper side to facilitate handling. The cross-sectional dimensions of the floating body 19 are such that it almost fills the section of the container 10, only leaving sufficient space for the outflow of the water poured into the container. Furthermore, the cross section of the floating body 19 is somewhat larger than the free filter surface of the sieve netting 14 so that the floating body extends on all sides into the region of the holder 15.

The upper side 21 of the floating body 19 acts as a deflecting surface for the water poured into the container 10 to produce the beverage. The force of this jet of water is exhausted on this upper side 21 so that it trickles over the edge of the floating body with very little force into the region below the floating body 19 and onto the coffee grounds. The floating body 19 rises with the level of the liquid in the container 10. As a result, the originally covered coffee grounds are left uncovered and the water already present in the container as well as the freshly added water is able to reach the coffee and percolate through it to produce the coffee beverage.

The special action of this floating body 19 consists in that at no stage in the preparation of the beverage does the water pour under high pressure onto the surface of the sieve netting 14. This prevents the fine particles of coffee from being pressed into the sieve netting 14 and from clogging the same.

In addition, the floating body 19 acts as a heat insulator for the water or coffee beverage on the otherwise open side of the container 10.

When relatively small amounts of coffee are to be prepared, the coffee grounds can be placed on the upper side 21 of the floating body 19 diposed directly upon the sieve netting 14. The water can then be added in the manner described.

In the case if the embodiment represented, the discharge connection 17 may be closed by means of a stopper 22 introduced from below. This closure allows the coffee to percolate for a longer period of time after the water has been poured into the container 10. Furthermore, the container 10 can be moved without dripping.

What is claimed is:

1. A filter device for preparing filtered coffee beverages having a filtering surface for receiving the ground roast coffee onto which water is to be poured and comprising a covering to be inserted in the device above the filtering surface, characterized in that the covering is in the form of a floatable deflecting element.

2. A device according to claim 1, characterized in that the deflecting element fills the free inner cross-section of the filter device to within a short distance from the inner wall thereof.

3. A device according to claim 1, characterized in that the deflecting element is hollow and made of plastic material.

4. A device according to claim 1, characterized in that the filtering surface comprises a fine-meshed monofilament plastic having mesh width of up to 10 $\mu$.

5. A device according to claim 4, characterized in that the filtering surface is held by a closed, circumferential frame-like holder and that it is adapted to be interchangeably mounted in the filter device by means of this holder.

6. A device according to claim 1, characterized in that the cross-sectional surface of the deflecting element is greater than the free surface area of the filtering surface.

7. A filter device for preparing filtered coffee beverages, said device comprising:
   a. a container for coffee grounds, said container being open at the top and bottom and having a constant internal cross-section over at least a portion of its height;
   b. a filtering surface having holes on the order of 5–10 $\mu$ mesh width removably mounted in said container adjacent to the bottom thereof, whereby said filtering surface is capable of supporting coffee within said container when in place, but may be removed and replaced; and
   c. an impervious floatable deflecting element contained within said container above said filtering surface and within a portion of said container having a constant internal cross-section, said deflecting element being dimensioned so that it fills the free inner cross-section of said container to within a short distance from the inner wall thereof, whereby said deflecting element is able to rise freely on top of water poured into said container, whereby coffee grounds may be placed in said container between said filtering surface and said floatable deflecting element and hot water may be poured on said floatable deflecting element in order to prepare a filtered coffee beverage without adversely affecting the taste of the filtered coffee beverage by forcing the coffee grounds into the holes in the filtering surface.

* * * * *